Feb. 3, 1931.  W. E. AHOLA ET AL  1,791,396
JACK
Filed April 12, 1928
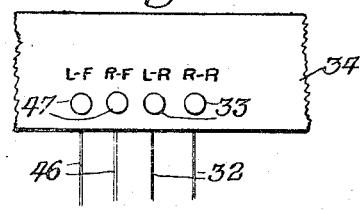
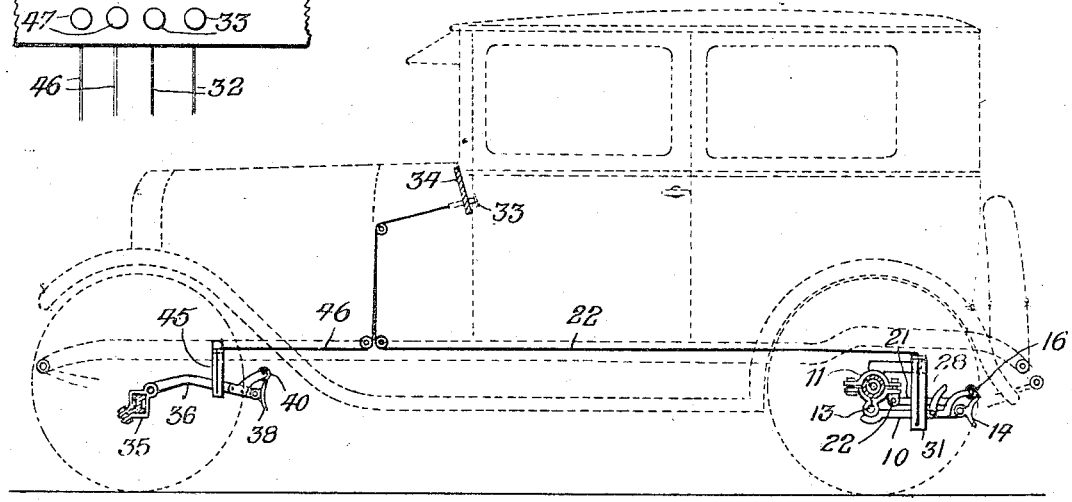
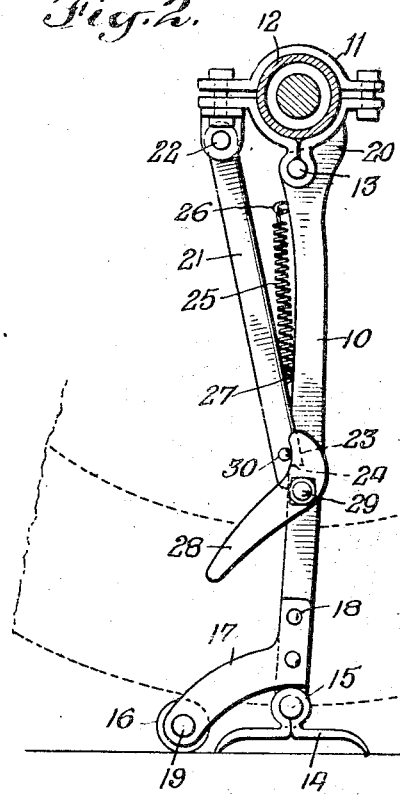
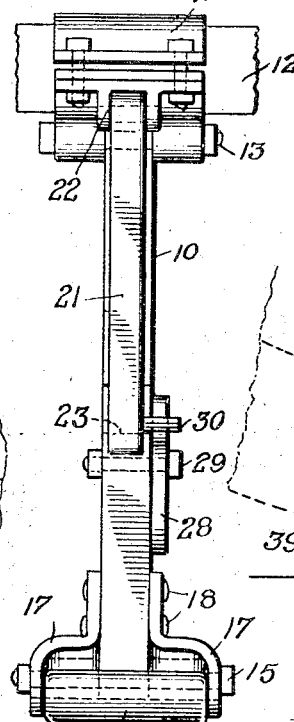
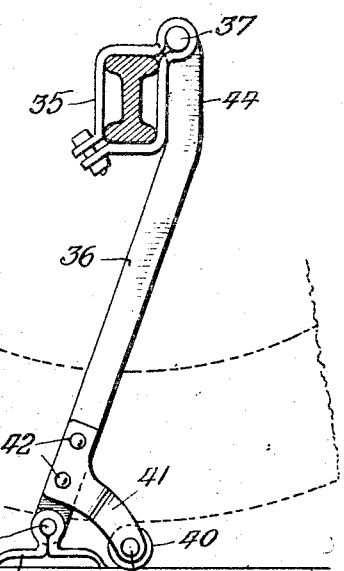
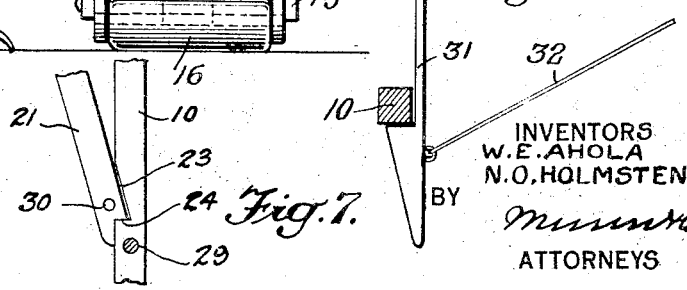
INVENTORS
W. E. AHOLA
N. O. HOLMSTEN
ATTORNEYS Patented Feb. 3, 1931

1,791,396

UNITED STATES PATENT OFFICE

WILLIAM E. AHOLA AND NIILO O. HOLMSTEN, OF NEW YORK, N. Y.

JACK

Application filed April 12, 1928. Serial No. 269,567.

This invention relates to jacks of the type employed in conjunction with parts of the running gear of an automobile, under the control of the driver, whereby the driver may cause any one of the traction wheels to be elevated sufficiently to permit tire changing and repairing operations to be carried out.

More particularly the invention relates to a jack mounted to be normally maintained in an inactive position, and so as to swing to an active position when released, to engage the ground or road surface, so that when the automobile is driven a slight distance, the jack will be brought to a jacking position, and thereby elevate a traction wheel.

The principal object of the invention is to provide a jack of the indicated character which will be of improved construction, which will more effectively grip the ground or road surface, and which will be effectively prevented from moving from a jacking position when the automobile is driven for the jacking operation.

With the foregoing and other objects in view, the invention resides in the particular provision, construction, and operation of the parts hereinafter fully described and illustrated in the accompanying drawing, in which—

Figure 1 is a side elevation of an automobile equipped with jacks constructed and operated in accordance with the present invention, the jacks being shown in inactive positions.

Fig. 2 is a side elevation of one of the jacks employed in conjunction with the rear axle structure of the running gear, the jack being shown in a jacking position.

Fig. 3 is a rear view of the jack shown in Fig. 2.

Fig. 4 is a side elevation of a jack employed in conjunction with the front axle of the running gear, the jack being shown in a jacking position.

Fig. 5 is a detail view of the latch.

Fig. 6 is a view of a portion of the instrument board of the automobile and latch releasing knobs.

Fig. 7 is a detail view.

In accordance with the present invention a jack is permanently associated with parts of the running gear of an automobile, preferably with the front axle and rear axle structure, there being one jack associated with each end of the front axle and each end of the rear axle structure, and means for normally maintaining each jack in an inactive position and which may be operated by the driver to release each jack for the purpose of elevating any one of the traction wheels of the automobile. The jacks are so arranged and constructed that when released will engage the ground or road surface and be brought to jacking position by driving the automobile a slight distance in a rearward direction.

The rear axle structure of the running gear has permanently associated therewith two jacks of similar construction, shown most clearly in Figs. 2 and 3. Each of these jacks includes a jack member 10. The upper end of the jack member 10 has connected therewith a shackle or like means 11 which serves for permanently associating the jack member 10 with the rear axle housing 12. The jack member 10 is pivotally connected as at 13 with the shackle 11 so as to be swung in a vertical plane. The lower end of the jack member 10 is provided with a ground or road engaging claw 14 of any suitable type adapted to penetrate the ground or road surface, and said claw is pivotally connected as at 15 with the lower end of the jack member 10. The lower end of the jack member 10 has a roller 16, and the said roller is operatively held in place by brackets 17 each of which is rigidly secured as at 18 to the jack member 10, and a shaft 19 supported by the bracket 17. The upper end of the jack member 10 has a portion 20 which engages the shackle to aid in preventing the movement of the jack member beyond the jacking position, when the automobile is being driven for the purpose of carrying out the jacking operation. The roller 16 together with the brackets 17 also serve with the portion 20 for the purpose mentioned, and to relieve the claw 14 from excessive weight and strain.

In order to further aid in preventing the movement of the jack member 10 beyond a jacking position and to brace the jack member 10 when in the jacking position, there is provided a brace member 21 pivotally connected at its upper end as at 22 with the shackle 11 and the lower end thereof having a notch to provide a shoulder 23 which is adapted to engage a shoulder 24 formed on the jack member 10. A coil spring 25 has one end thereof connected as at 26 with the jack member 10, and the opposite end is connected as at 27 with the brace member 21. The spring 25 has a normal tendency to urge the lower end of the brace member 21 toward the jack member 10, and to bring the shoulder 23 into engagement with the shoulder 24, as the jack member 10 is being swung to the active position. A trigger 28 is pivotally connected as at 29 with the jack member 10 and is adapted to push on a pin 30 carried by the lower end of the brace member 21. By pressing on the trigger 28 with the foot, pressure will be exerted on the pin 30 and as a consequence the shoulder 23 will be moved out of engagement with the shoulder 24 allowing the jack member and parts connected therewith to be swung upwardly to a substantially horizontal position in which the jack member 10 will be engaged by a spring latch member 31 fixedly secured in any suitable manner to a part of the running gear. The latch 31 has connected therewith one end of a flexible member 32 which passes over suitable guide pulleys and is connected with a knob 33 operatively positioned on the instrument board 34 of the automobile.

When it is desired to elevate one of the rear traction wheels of the automobile, the knob 33 is pulled which actuates the latch member 31, allowing the jack member 10 to drop to an angular position with the claw 14 in engagement with the ground or road surface. By driving the automobile backwards a slight distance, the jack member 10 will be brought to a substantially vertical position, thereby elevating the traction wheel from the ground or road surface. The jack member 10 will be prevented from moving beyond the vertical or jacking position by the engagement of the portion 20 of the jack member 10 with the shackle 11. As the jack member 10 is moved to the jacking position, the shoulder 23 on the end of the brace member 21 will be automatically brought into engagement with the shoulder 24 on the jack member 10, by the action of the spring 25 on the brace member 21. The brace member 21 holds the jack member 10 against rearward movement, and at the same time braces the jack member 10 when in the jacking position, as shown in Fig. 2. When the jack member 10 is in the jacking position, the roller 16 is in contact with the ground or road surface, and relieves the claw 14 of any undue strain and also aids in supporting the weight. When it is desired to lower the traction wheel, it is only necessary to manipulate the trigger 28 with the foot so as to disengage the brace member 21 from the jack member 10, whereupon the jack member 10 may be swung to the inactive position in which it is held by the latch member 31.

The front axle, near each end thereof has connected therewith a jack which includes a shackle 35, with which a jack member 36 is pivotally connected as at 37. The lower end of the jack member 36 has a claw 38 pivotally connected therewith as at 39, and also has connected therewith a roller 40 by the employment of brackets 41 rigidly connected as at 42 with the jack member 36, and a shaft 43 supported by the brackets 41 on which the roller 40 turns. The jack member 36 is of angular construction and presents a portion 44 which engages the shackle 35 when the jack member 36 is in the jacking position, in order to prevent movement of the jack member 36 beyond the jacking position, as the automobile is driven backwards slightly for the jacking operation. The jack member 36 swings in a vertical plane and is held in an inactive position by the use of a spring latch member 45 carried by part of the frame of the running gear. The latch member 45 is under the control of a flexible member 46 connected at one end with the latch member 45, and is passed over suitable guide pulleys, and has a knob 47 connected with the opposite end, the said knob 47 being positioned on the instrument board 34. Each front jack operates substantially similar to the rear jack, and is different from the latter only in that it does not include the brace member 21, and parts related to the brace member 21.

We claim:

1. A device adapted to be associated with a part of the running gear of a vehicle for elevating one of the traction wheels thereof in response to movement of the vehicle, said device including a jack member, attaching means for connecting the jack member with said part for swinging movement in a vertical plane from an inactive position to a jacking position, and said jack member having a relatively movable ground engaging claw and a ground engaging roller on the lower end thereof at the rear of said claw.

2. A device adapted to be associated with a part of the running gear of a vehicle for elevating one of the traction wheels thereof in response to movement of the vehicle, said device including a jack member, attaching means for connecting the jack member with said part for swinging movement in a vertical plane from an inactive position to a jacking position, said jack member having a relatively movable ground engaging claw on the lower end thereof, means acting to limit the swinging movement of the jack member to the jacking position, and a rigid brace member depending from and movable with respect to the attaching means which acts to brace the jack member, and also to prevent swinging movement of the jack member toward the inactive position, while in the jacking position.

3. A device adapted to be associated with a part of the running gear of a vehicle for elevating one of the traction wheels thereof in response to movement of the vehicle, said device including a jack member, attaching means for connecting the jack member with said part for swinging movement in a vertical plane from an inactive position to a jacking position, said jack member having a relatively movable ground engaging claw on the lower end thereof, means acting to limit the swinging movement of the jack member to the jacking position, a spring actuated rigid brace member pivotally connected with and depending from the attaching means which acts to brace the jack member, and also to prevent swinging movement of the jack member toward the inactive position, while in the jacking position, and means for releasing the brace member.

4. A device adapted to be associated with an axle of the running gear of a vehicle for elevating one of the traction wheels thereof in response to the movement of the vehicle, said device comprising a ground engaging jack member, attaching means for connecting the jack member with said axle for swinging movement from an inactive position to a jacking position, means acting to limit the swinging movement of the jack member to the jacking position, a rigid brace member, means mounting the brace member for swinging movement into and out of engagement with the jack member, means acting on the brace member to move it into engagement with the jack member when the latter is being moved into the jacking position, to brace the jack member, and also to prevent swinging movement of the jack member toward the inactive position, while in the jacking position, and means for moving the brace member out of engagement with the jack member to allow the latter to be swung to the inactive position.

Signed at New York in the county of New York and State of New York this 2nd day of April, 1928.

WILLIAM E. AHOLA.
NIILO O. HOLMSTEN.